(12) United States Patent
Faith et al.

(10) Patent No.: US 7,946,502 B2
(45) Date of Patent: *May 24, 2011

(54) FINANCIAL TRANSACTION TOKEN

(75) Inventors: Patrick L. Faith, Pleasanton, CA (US);
Ayman A. Hammad, Peasanton, CA (US)

(73) Assignee: Visa USA Inc., Foster City, CA (US)

( * ) Notice: Subject to any disclaimer, the term of this patent is extended or adjusted under 35 U.S.C. 154(b) by 564 days.

This patent is subject to a terminal disclaimer.

(21) Appl. No.: 12/017,593

(22) Filed: Jan. 22, 2008

(65) Prior Publication Data

US 2009/0184167 A1    Jul. 23, 2009

(51) Int. Cl.
| G06K 19/06 | (2006.01) |
| --- | --- |
| G06K 5/00 | (2006.01) |
| G06K 19/00 | (2006.01) |
| G06F 7/08 | (2006.01) |
| G06Q 20/00 | (2006.01) |
| G06Q 40/00 | (2006.01) |

(52) U.S. Cl. ........ 235/492; 235/380; 235/381; 235/487; 705/17; 705/39; 705/41; 705/65

(58) Field of Classification Search .......... 235/380–381, 235/487, 492; 705/65, 17, 35, 39, 41, 64, 705/67; 361/737
See application file for complete search history.

(56) References Cited

U.S. PATENT DOCUMENTS

| 6,459,588 | B1* | 10/2002 | Morizumi et al. ............ 361/737 |
| --- | --- | --- | --- |
| 6,585,165 | B1* | 7/2003 | Kuroda et al. ................ 235/492 |
| 2004/0129787 | A1* | 7/2004 | Saito et al. ................... 235/492 |
| 2005/0001711 | A1* | 1/2005 | Doughty et al. ............. 340/5.74 |
| 2006/0043200 | A1* | 3/2006 | Puschner et al. .............. 235/492 |
| 2006/0186209 | A1* | 8/2006 | Narendra et al. ............. 235/492 |
| 2006/0261174 | A1* | 11/2006 | Zellner et al. ................ 235/492 |
| 2006/0287964 | A1 | 12/2006 | Brown |
| 2007/0285246 | A1* | 12/2007 | Koyama .................... 340/572.1 |
| 2008/0319911 | A1* | 12/2008 | Faith et al. ..................... 705/65 |
| 2008/0319912 | A1* | 12/2008 | Faith et al. ..................... 705/65 |
| 2009/0308921 | A1* | 12/2009 | Mullen ........................ 235/382 |

FOREIGN PATENT DOCUMENTS

| WO | WO 2004/013804 A1 | 2/2004 |
| --- | --- | --- |
| WO | WO 2006/105092 A3 | 10/2006 |

* cited by examiner

*Primary Examiner* — Thien M. Le
*Assistant Examiner* — April A Taylor
(74) *Attorney, Agent, or Firm* — Kilpatrick Townsend & Stockton LLP

(57) ABSTRACT

There is provided a card or token for use in financial transactions. The financial transaction token or card has an onboard energy storage device that enables onboard electronics to operate when the card is not in the proximity of a merchant Point-Of-Service (POS) terminal. In one implementation, the onboard energy storage device includes a capacitor such as a thin-film capacitor that stores sufficient energy to power onboard electronics without the need for an onboard battery. The card may be incorporated within various conventional apparatus such as a see-through and/or protective substrate, an item of clothing, an item of jewelry, a cell phone, a Personal Digital Assistant (PDA), a credit card, an identification card, a money holder, a wallet, a personal organizer, a keychain payment tag, and like personality.

45 Claims, 6 Drawing Sheets

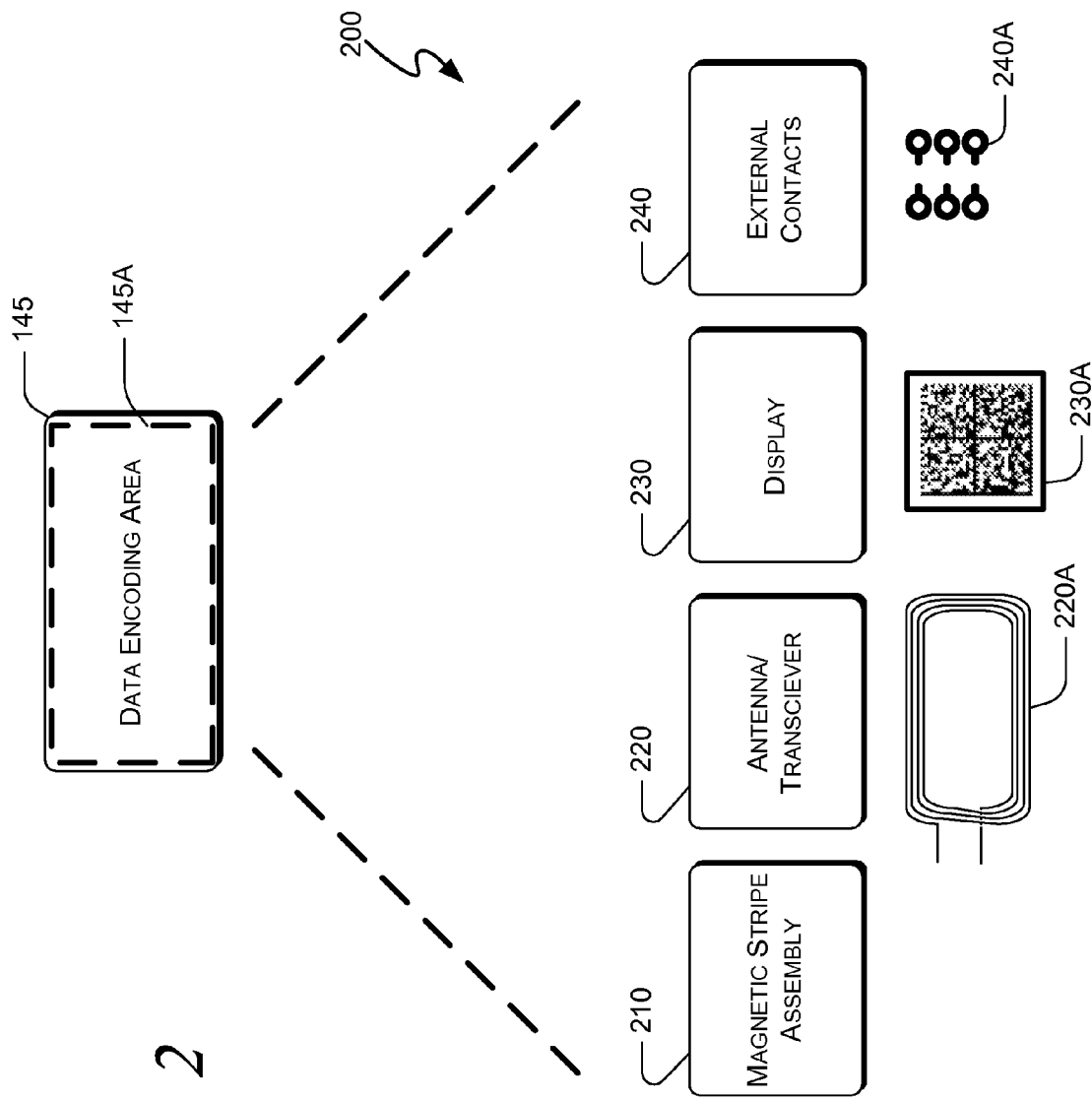

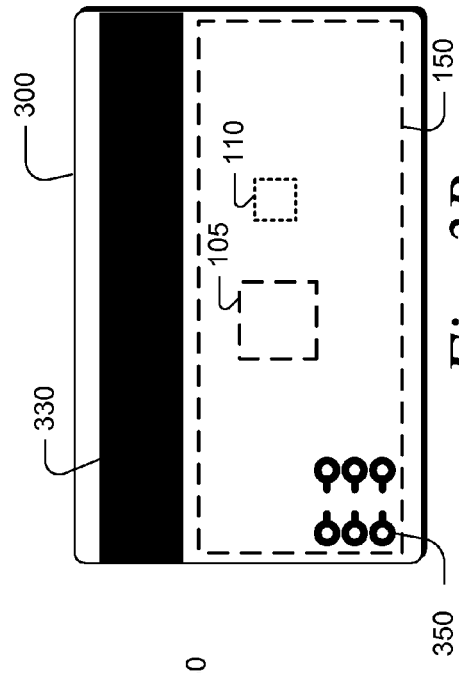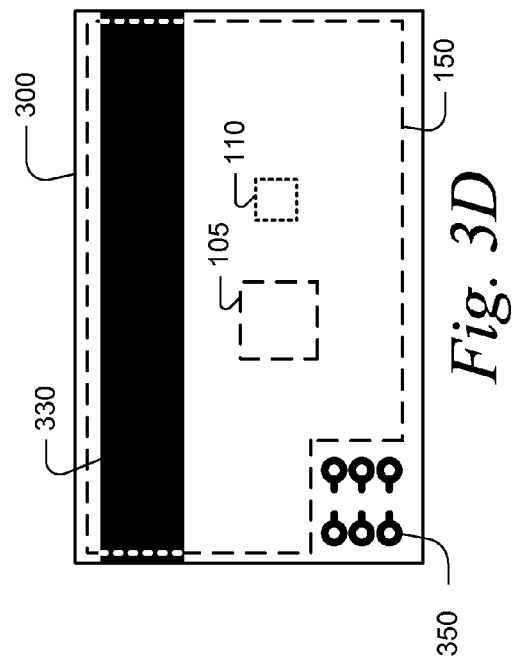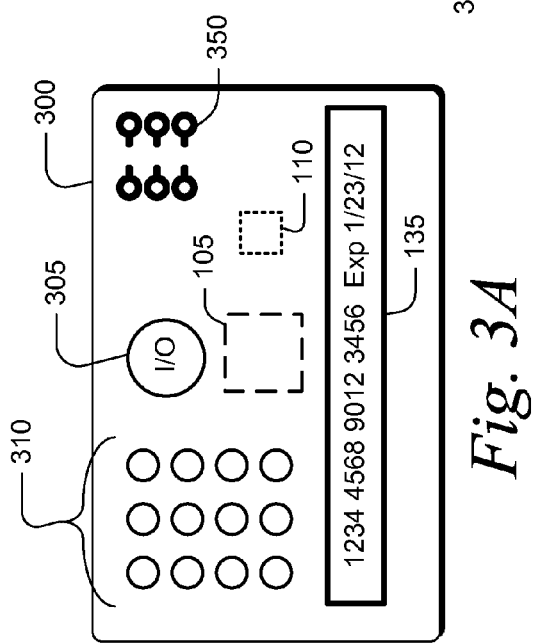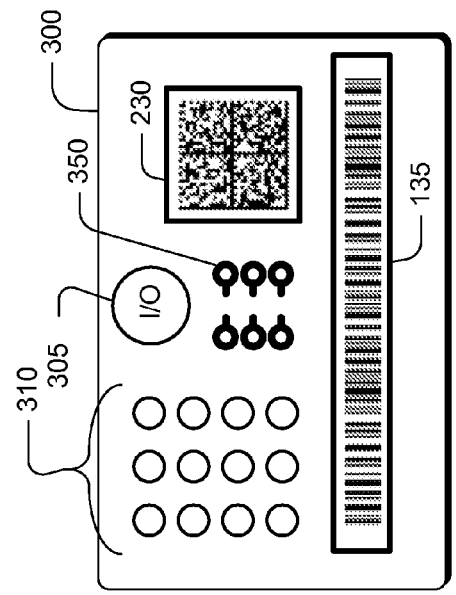
Fig. 3A
Fig. 3B
Fig. 3C
Fig. 3D

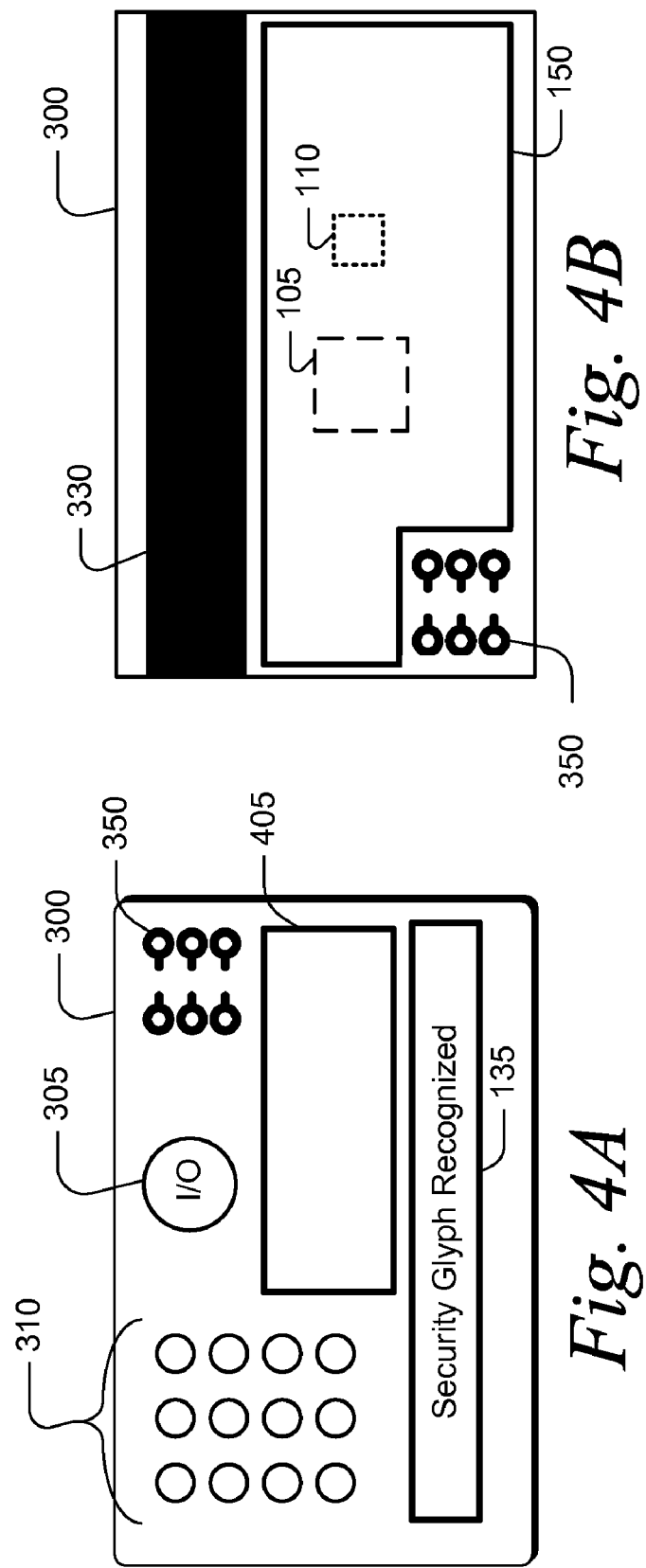

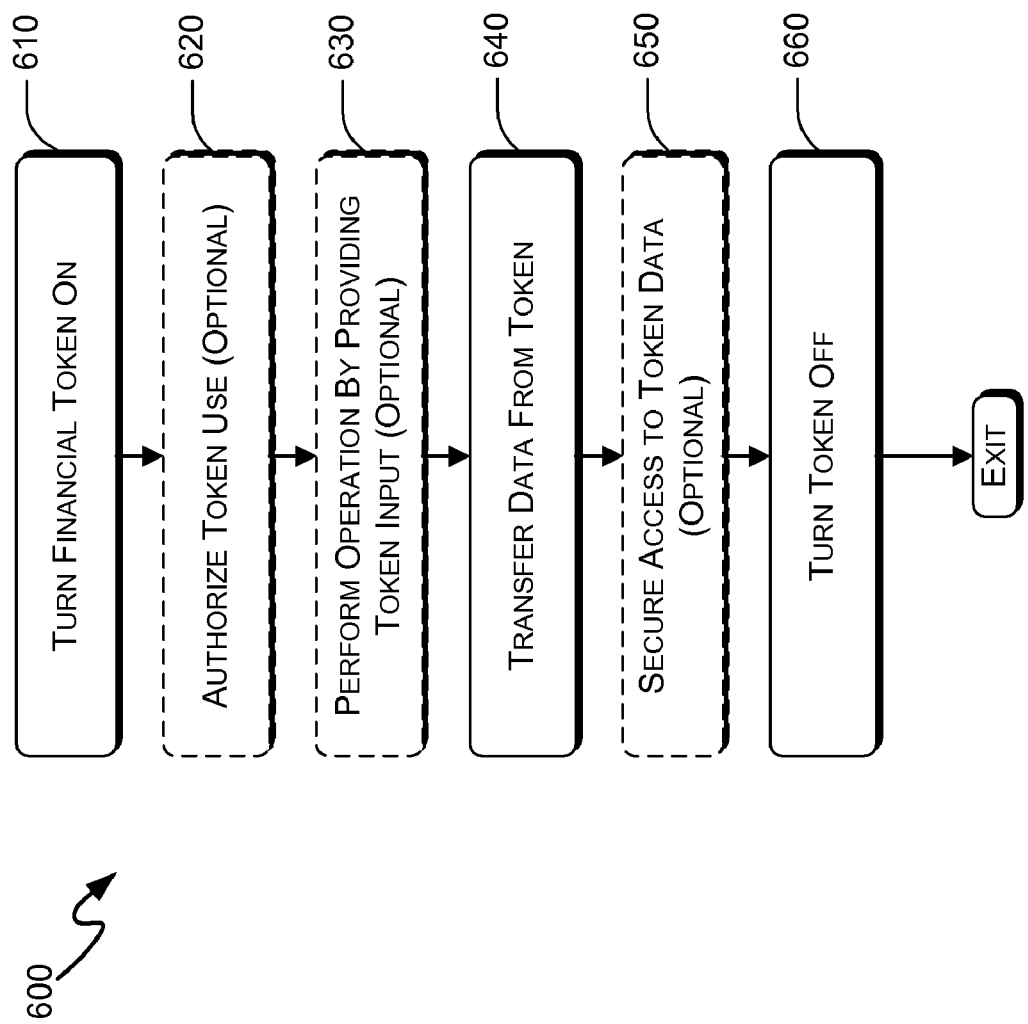

FINANCIAL TRANSACTION TOKEN

BACKGROUND

Increasingly, consumers have come to rely on debit, credit, and stored value cards as a preferred vehicle to provide payment for transactions. Credit cards provide ready access to funds, offer financial protection superior to cash or checks, support loyalty programs, and allow consumers to take advantage of purchasing opportunities when funds may not be otherwise available. As debit and stored value cards have become increasingly popular, the need for consumers to carry cash or checkbooks is still further reduced.

Within the past few years, card associations and issuers have been providing transaction cards that are enhanced with features beyond the typical embossed account number, expiration date, cardholder name, and signature area. "Smart cards," for example, have now come into popular use, and allow for enhanced security of both debit and credit cards by use of onboard integrated circuits to provide memory and optional microprocessor functionality. Smart cards and other enhanced or memory cards or tokens have found uses from replacements for simple embossed credit/debit cards, toll booth payment, ATM card replacements, and even Subscriber Identity Module (SIM) cards in cellular handsets.

Even though smart cards and electronics-enhanced cards have provided improvements over traditional credit cards, they suffer from a number of deficiencies. For example, electronics circuitry on enhanced financial transaction cards must receive externally-provided power to operate. To obtain power from a merchant's financial or Point-Of-Service (POS) terminal, contact-type smart cards use a physical connector interface; two of such interfaces are defined ISO standards 7810 and 7816. However, many types of cards not in physical contact with a POS terminal or other power source cannot operate, and therefore these cards are necessarily inactive at all other times. Alternatively, some enhanced financial transaction cards obtain power from a terminal-generated RF electromagnetic field by way of an inductor that is part of the card's circuitry. For example, ISO 14443 defines a popular contactless financial transaction card protocol. However, current contactless cards must be in close proximity to the properly modulated electromagnetic field in order to operate (10 cm in the case of ISO 14443-compliant cards). Due to the intentionally limited power and range of such short range fields, RF-powered cards cannot operate outside of the immediate area of a merchant's POS terminal, and may not have sufficient power in some cases to provide sophisticated electronic computations or allow more power consuming circuitry such as displays. Further, embedded chips of some contactless smart cards often employ cryptographic security algorithms that can be "cracked" or decoded if the time and electrical current required for certain encryption or decryption operations is measured. Several demonstrations of this mode of account compromise have been demonstrated, and thus, the possibility of surreptitious measurement of such parameters without knowledge of the cardholder presents a significant security risk.

What is needed then is a financial transaction card or token that provides an onboard power source. What is further needed is a financial transaction card or token that has an onboard power source that does not utilize the hazardous chemicals associated with typical power sources such as replaceable or rechargeable batteries. What is also needed is a financial transaction card or token that has a power source that is rechargeable and has a form factor that may be used with common credit card form factors. What is further needed is a financial transaction token with electronic circuitry that can operate in an environment significantly removed from a POS terminal. What is also needed is a financial transaction token that utilizes an onboard power source to provide cryptographic security and protect the token when not in use. What is still further needed is a financial transaction token that may reprogram itself using an onboard power source to encode a variety of types of account information, thereby allowing for payment flexibility of the financial transaction token. What is also needed is a financial transaction token that allows the holder to view information stored in the token without being in proximity to a POS terminal.

SUMMARY

There is provided an apparatus for a token to complete financial transactions. The financial transaction token or card has an onboard energy storage device that enables onboard electronics to operate when the token or card is not in the proximity of a merchant terminal (e.g.; a POS terminal). In one implementation, the onboard energy storage device includes a capacitor such as a thin-film capacitor that stores sufficient energy to power the token's onboard electronics without the need for an onboard battery. The financial transaction token may be incorporated within an apparatus such as a plastic substrate, an item of clothing, an item of jewelry, a cell phone, a PDA, a credit card, an identification card, a money holder, a wallet, a personal organizer, or a keychain payment tag.

In one implementation, the financial transaction token includes a capacitor that energizes the token's electronics circuitry. An exposed region is provided for encoding data including an account to pay for a transaction. The encoding renders data in several alternate or complementary formats, such as light- or laser-scannable bar coding on a display, electromagnetic signals that are transmitted to a merchant receiver, external contact pads for a contact-based pickup, and a magnetic stripe assembly. In one implementation, the token is reprogrammable by the holder by inputting information to a user interface, and a processor in the token accepts the information and runs software in a processor located within the token. This reprogrammable feature enables the holder of the token to secure the token by erasing a display or magnetic stripe or locking the token from unauthorized use. The token, when access is granted, may perform calculations such as adding a tip from a predetermined tip percentage, or selecting payment to occur from a variety of different financial accounts. In one implementation, a magnetic stripe assembly in proximity to the token is reprogrammable, so that the processor may select a particular account from user input, and provide instructions to reprogram the magnetic stripe. The reprogrammed stripe may then be swiped through a conventional merchant magnetic stripe reader to initiate payment for a transaction. In another implementation, the token also includes a memory that may optionally be maintained by the onboard energy source.

In another implementation, a financial transaction card is provided that has a substantially rigid substrate not unlike conventional credit cards and an onboard energy storage device such as a thin-film capacitor. The card includes, in one implementation, a conventional or reprogrammable magnetic stripe assembly that is disposed proximal the substrate. As mentioned previously, the reprogrammable substrate may be configured by a processor that is commanded through cardholder inputs. In one implementation, the cardholder provides input through an array of contact pads or blister buttons, and optionally may have access to an on/off button that may turn on the card to accept input, or turn the card off into a power-saving mode. Alternately, the user input section may include a biometric input device that scans fingerprints or other biometric data to authenticate the user of the card, or may have a pressure-sensitive area for inputting a predetermined access glyph such as by a card user dragging a fingertip over a pad to reproduce a symbol that the card user has previously identified.

Various features and advantages of the invention can be more fully appreciated with reference to the detailed description and accompanying drawings that follow.

DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 2 illustrates possible alternate implementations of the data encoding area seen in FIG. 1;

FIGS. 3A-3B show front and rear views, respectively, of an exemplary implementation of a financial transaction token;

FIGS. 3C-3D show front and rear views, respectively, of another exemplary implementation of a financial transaction token;

FIGS. 4A-4B show a front and rear views, respectively, of yet another exemplary implementation of a financial transaction token;

FIG. 6 illustrates an exemplary process for the use of various contemplated implementations a financial transaction token.

DETAILED DESCRIPTION

Figure 1:
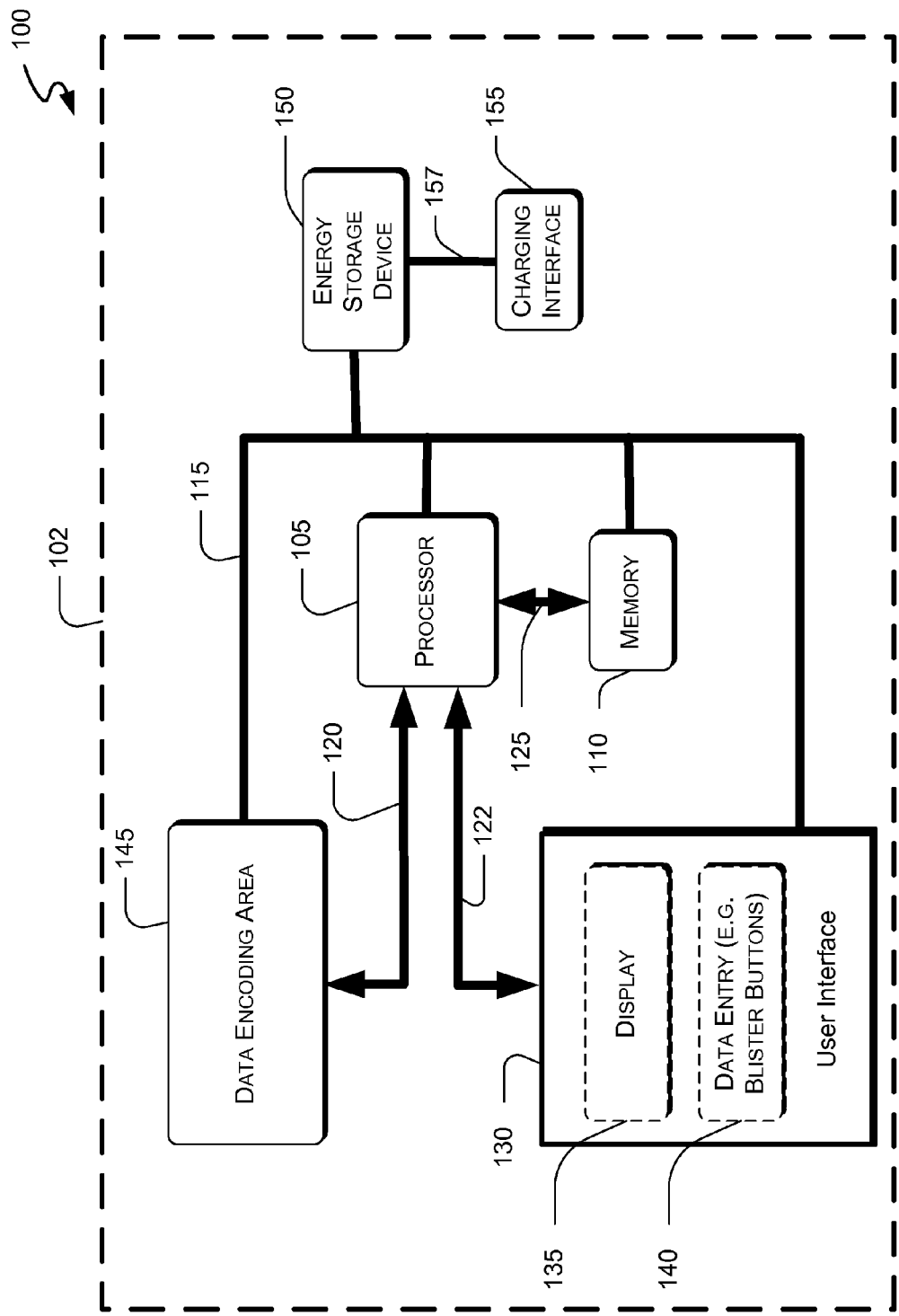
FIG. 1 depicts a block diagram of an exemplary implementation of a financial transaction token including a data encoding area and a charging interface.

A block diagram for an exemplary implementation of a financial transaction token 100 is seen FIG. 1. The financial transaction token 100 comprises an assembly 102 that houses, supports, and/or integrates the components shown in FIG. 1. The financial transaction token includes a processor 105, which those of skill in the relevant arts will appreciate may comprise a microprocessor chip, a microcontroller chip, an ASIC, or a smart card chip. The processor 105 is coupled to a power circuit 115. The power circuit 115 provides power to the token's electronic components 105, 110, 130, 145, and 150, and may further include signals indicating charging or connection status. The processor 105 is further coupled to signal busses 120, 122, and 125, which those of skill in the relevant arts will recognize may be comprised of a plurality of individual dedicated signal circuits, commonly shared signal busses, bidirectional signal circuits, unidirectional signal circuits, or combinations thereof. In one implementation, signal busses 120, 122, and 125 comprise a single commonly shared address/data bus with associated control signals. The processor is coupled to a memory 110 through signal bus 125. The memory 110 may comprise volatile memory such as CMOS or DRAM memory, nonvolatile memory such as ROM, PROM, EEPROM, or flash memory, or combinations thereof, and such memory may be included in total or in part upon the same integrated circuit substrate as the processor 105. The memory 110, if of volatile type, may have its data values preserved by power provided by the connected power circuit 115. Data stored in memory 110 may include code or program instructions which, when executed by processor 105, performs at least part of a process 600 seen in FIG. 6 as described below.

An onboard energy storage device 150 is coupled to and energizes the power circuit 115. Those of skill in the relevant arts will also recognize that energy storage devices such as batteries, inductors, capacitors, or combinations thereof may be utilized to implement the energy storage device 150. In one implementation, energy storage device 150 comprises a thin film capacitor, and may utilize a single dielectric or a multilayer configuration alternating conducting layers and dielectric layers. A number of dielectrics such as polyester, polypropylene, polycarbonate, polystyrene, polyimide, PTFE, PET, and combinations thereof may be utilized in such thin film capacitor implementations. A substantially planar thin film capacitor implementation is beneficial for implementation in the instant financial transaction token circuit, as the substantially planar form factor may be applied on a surface of a financial transaction card or token, or may be wholly or partially buried within a cavity defined within the substrate of a financial transaction card or token 100. Implementation of the energy storage device 150 as a single or multilayer capacitor also provides the benefit of avoiding the use of the leakable and potentially dangerous electrolytes associated with batteries, while also allowing quick rechargeability. With no toxic electrolytes needed in the capacitor implementation, the financial transaction token 100 may be more safely carried in a wallet or purse, and may also be disposed of with fewer environment toxicity concerns.

Figure 5A:
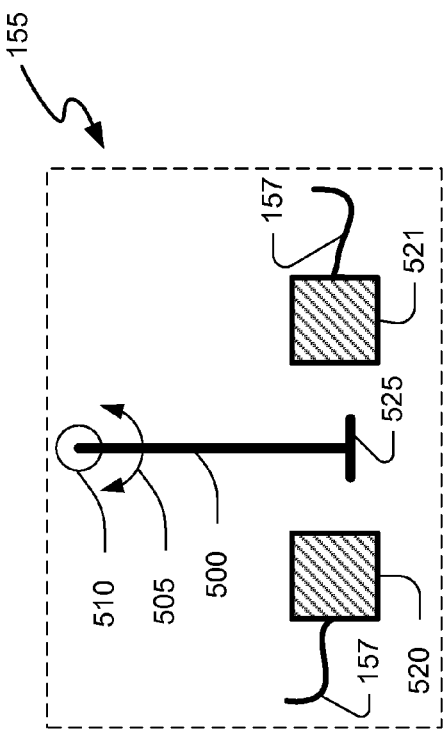
FIGS. 5A-5B show illustrations of a pendulum and piezoelectric crystal implementation of the charging interface seen in FIG. 1.
Figure 5B:
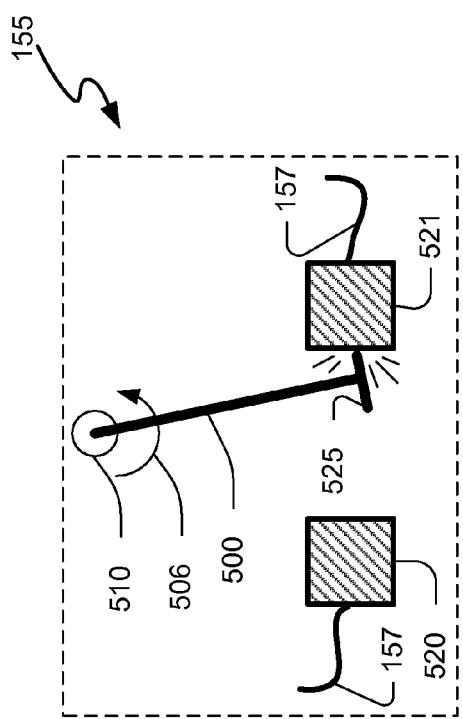

The energy storage device 150, via a coupling 157, is in electrical communication with a charging interface 155. Those of skill in the relevant arts will readily recognize that the charging interface 155 may be implemented with electrical contacts to an external charger, or an inductor for receiving power via electromagnetic radiation. In one implementation, charging interface 155 further includes one or more piezoelectric crystals electrically connected, via coupling 157, to the energy storage device 150, and a movable pendulum mass that strikes the piezoelectric crystals as the token 100 is moved. Turning to FIG. 5A, a piezoelectric charger implementation of the charging interface 155 is shown. A movable pendulum mass 500 rotates 505, preferably in a substantially planar motion, about a pinned end 510. The pendulum mass 500 also has an impact end 525, that is disposed between and may strike either of two piezoelectric crystals 520, 521. As the crystals 520, 521 are electrically coupled 157 to the energy storage device 150, impacts of the pendulum mass 500 cause pulses of current to be delivered to the energy storage device 150 thus charging the storage device 150. FIG. 5B provides an illustration of the pendulum 500 moving 506 to strike crystal 521, and likewise, the pendulum mass 500 may move the opposite direction to strike the other crystal 520.

Returning to FIG. 1, a user interface 130 is also provided, and is coupled to the power circuit 115 and to the processor 105 via signal bus 122. In one implementation, the user interface may include one or more conventional displays 135 that may output text, graphics, or a combination. The display 135 may be implemented in such formats as a liquid crystal display, a thin film transistor display, touch screen, or organic LED display. The user interface 130 also includes an optional data entry apparatus 140. In one implementation, the data entry apparatus 140 may include an array of buttons labeled in a manner such as a QWERTY keyboard, a touch pad, a touch screen, or in a more simplistic implementation, as a telephone touch pad with alphanumeric key assignments. In one implementation, the buttons in the data entry apparatus 140 may comprise blister buttons commonly known in the art. The user interface 130 may also include an optional on/off button that activates the card for selecting desired account access, performing a calculation, or authenticating a user.

A data encoding area 145 is also provided. The data encoding area receives data and/or commands for displaying text or graphical information from bus 120, and receives power from power circuit 115. As the processor 105 may select the appropriate data based on user input to the user interface 130, a variety of data may be provided. In one implementation, the information provided to the data encoding area 145 may comprise health care information, personal identity information, biometric data, music, video data, or a combination thereof, and is considered interchangeable with the term "account data" used herein.

Turning to FIG. 2, possible implementations 200 of the data encoding area 145 are shown. Data encoding area 145 is shown with an optional shielding element 145A, which allows desired electromagnetic, optical, or radiative signals to penetrate while protecting the data encoding area 145 from physical abuse or damage. The token 100 may optionally have areas outside of the data encoding area 145 shielded from physical abuse or otherwise acceptable forms of electromagnetic radiation. Some of the acceptable signals that are allowed to penetrate the shielding 145A and may include, but are not limited to, signals accompanying a magnetic field, RFID signals, IrDA signals, visible light, invisible light, modulated laser, and/or modulated RF communication signals. By way of example and not by way of limitation, selective shielding element 145A may comprise a clear plastic shield, conformal coatings, an opaque plastic shield, or a clear thin film, depending on the implementation of data encoding area 145.

Non-limiting examples of the data encoding area are shown at reference numeral 200, and include a magnetic stripe assembly 210, an antenna and/or transceiver 220, a display and/or touch screen 230, and electrical contacts 240. The magnetic stripe assembly 210 may comprise, in one implementation, a reprogrammable magnetic stripe that accepts data and/or commands from the processor 105 and formats and renders that data into a form on a magnetic stripe that is readable by conventional merchant magnetic stripe-reading POS terminals. In this manner, the processor 105 may program a particular account for use in a transaction as a function of user input selecting the account. Alternatively, the processor 105 may erase the magnetic stripe of the assembly 210, rendering the card useless in the event of its loss or theft.

Continuing with FIG. 2, another implementation of the data encoding area 145 is shown as an antenna and/or transceiver 220. The antenna 220 may include commonly used loop inductors such as the one shown 220A or in those shown in related ISO standards for RF-readable smart cards. With such an interface, account data may be translated, modulated and transmitted in a manner acceptable by an RF contactless merchant Point-Of-Service (POS) terminal.

The data encoding area 145 may also be represented with a display and/or touch screen 230. Account data may be rendered in the form of an optically-readable area, such as a one dimensional or two dimensional bar code 230A. In this manner, merchant POS terminals may optically scan the display area 230 with conventional laser scanners, and obtain account information without the need for expensive contactless RF POS terminals. As the display is electronically reconfigurable with information provided by the processor 105, the token 100 may represent any number of accounts for transaction payment based on the user's preference and input to the user interface 130. Also, as a security feature, the display may be blanked or filled with a decorative or entertaining graphic when the user has not provided an optional security access code, pad stroke, or pin number to the user interface 130. Alternatively, the display 230 may comprise a touch screen, and the user may provide authentication information by touching the display 230 in specified areas to indicate sequences of pin numbers, selected graphical elements, or drag strokes that match a predetermined access criterion stored within the memory 110.

External contacts 240 are yet another alternative implementation of the data encoding area 145 shown in FIG. 2. With the financial transaction token 100 possessing physical contacts such as an array of conductive pads or shapes 240A, the financial transaction token may be placed in physical contact with a merchant POS terminals, and the external contacts 240 may establish connectivity to the merchant's financial processing system. The processor 105 may relay account-related information to the merchant POS terminal through the contact interface, thereby allowing the token 100 to be utilized with the large number of preexisting merchant POS terminals that accept smart cards. As with the other implementations 210, 220, and 230 of the data encoding area 145, a combination of techniques may be utilized within the data encoding area to provide flexibility of use and ease of merchant access to account information.

Turning to FIGS. 3A-3D and 4A-4B, various and exemplary implementations of a financial transaction card 300 are shown. The substrate of the card 300 is substantially rigid and thin as are conventional credit or debit cards, and possesses substantially similar dimensions as existing credit, debit, stored value, or smart cards. In one implementation, the thickness of card 300 exceeds that of conventional credit, debit, or stored value cards in order to accommodate circuitry, electronics, displays, and/or interface elements. The substrate of the card 300 contains embedded processor 105 and memory 110, and a circuit topology as described in regards to the block diagram for token 100 of FIG. 1.

In FIG. 3A, a front side of card 300 is shown with an array of buttons 310 and an on/off button 305 comprising elements of the user interface 130. The front side of the card 300 also includes a display 135 for outputting alphanumeric text or graphics, such as an account number and expiration date. An array of physical contacts 350 is shown, which may be utilized in conjunction with data entry 140, the data encoding area 145, and/or the charging interface 155. Those of skill in the relevant arts will readily appreciate that the contacts 350 shown in FIGS. 3A-3D may include more or less electrical contact elements than those shown depending on the particular use, and may be located together or separately on any side or portion of the card 300 as required by merchant POS terminals, interoperability requirements, or circuit topology.

FIG. 3C shows a front view of an alternate implementation of card 300, with a similar array of buttons 310 and an on/off button 305 comprising elements of the user interface 130. An array of physical contacts 350 is shown, which may be utilized in conjunction with data entry 140, the data encoding area 145, and/or the charging interface 155. A display 135 is shown encoding a barcode that may be scanned by an optical scanner available at merchant locations, and may relay data from processor 105 (embedded, not shown) to provide account-related or other data. A display 230 as part of an implementation of the data encoding area 145 is also shown, with a 2-d barcode illustrated that is readable by optical means to provide account-related or other data that was relayed by the processor 105. Those of skill in the relevant arts will recognize that such combination of features may be interchanged with those described in other aspects of the financial transaction token.

FIG. 4A shows a front view of another implementation of card 300, with a similar array of buttons 310 and an on/off button 305 comprising elements of the user interface 130. An array of physical contacts 350 is shown, which may be utilized in conjunction with data entry 140, the data encoding area 145, and/or the charging interface 155. The user interface 130 of the card shown in FIG. 4A also includes a touch pad or touch screen 405. The touch pad or screen 405 accepts inputs from physical contact by either a stylus, pen, or fingertip, and in one implementation, allows a user to provide input to authorize use of the card.

In one implementation, the user turns on the card by depressing the on/off button 305, then produces a stroke on the pad/screen 405 by dragging a fingertip or stylus across the pad or screen area 405 to reproduce a symbol or glyph substantially similar to a symbol pre-programmed into the processor 105 and memory 110 (embedded, not shown). Once the symbol or glyph is entered by the user on the pad/screen 405, the processor compares its features with a pre-stored graphical implementation and if the symbol's features are within a predetermined range, the card 300 is enabled for use, otherwise an invalid entry message is output to display 135 and use is further inhibited until the successful glyph or symbol is entered.

FIGS. 3B, 3D, and 4B show rear views of respective implementations of a financial transaction card 300. The card 300 has a magnetic stripe 330 which like conventional magnetic stripe fields, is readable in preexisting merchant POS terminals or ATMs. The magnetic stripe 330, as part of the data encoding area 145 and magnetic stripe assembly 210 may optionally be programmable by data and commands sent from the embedded processor 105 and memory 110.

Also shown on the card 300 is an optional array of physical contacts 350, which, as described above may be utilized in conjunction with data entry apparatus 140, the data encoding area 145, and/or the charging interface 155. Those of skill in the relevant arts will also recognize that other of the aforementioned data encoding elements 145 or user interface elements 130 may reside on the back surface of the card 300, and this orientation may be preferential to preserve account security or allow additional features on a limited card area.

An energy storage device 150 is shown embedded in the card 300 in FIGS. 3B and 3D, and may comprise a thin film capacitor. Those of skill in the relevant arts will recognize that such a capacitor may be applied to the surface of the card 300 as shown in FIG. 4B at reference numeral 150 rather than being located within a substrate cavity in the card 300, and may have an optional protective film, conformal coating, or encapsulant added to protect the capacitor. Those of skill in the relevant arts will also recognize that an energy storage device 150 may comprise any number of shapes and may occupy significantly all or part of the cross sectional area defined by the outer perimeter of the card 300. In the illustration shown in FIG. 3B, for example, the energy storage device 150 spans covers an area approximately two thirds of the cross-sectional area of the card 300 but could be configured to cover more or less area depending on the amount of energy storage desired and the particular layout of the card's circuitry. In FIG. 3D, the buried energy storage device 150 resides under the magnetic stripe 330 and does not occupy space in proximity to the physical contacts 350.

FIG. 6 illustrates an exemplary process 600 for the use of various implementations of a financial transaction token such as financial transaction token 100 seen in FIG. 1. In step 610 the financial transaction token 100 or card 300 is turned on so that the processor 105 may assume an active state and operate by retrieving and executing program instructions stored in the memory 110. The power-on condition may be triggered by one or more of the following conditions: (a) inserting the token 100 or card 300 into a merchant POS terminal and making contact between electrical contacts in the token 100 or card 300 and the merchant POS terminal; (b) inserting the token 100 or card 300 into a user device such as a cell phone, PDA, charger, or accessory; (c) attaching an electrical connector such as a USB or Firewire connector to the token 100 or card 300; (d) depressing an on/off button 305 and/or holding the on/off button down for a predetermined period of time; (e) depressing a general purpose button 310; (f) touching a touch screen or touch pad 405; or (g) bringing a token 100 or card 300 equipped with an antenna/transceiver 220 within range of an RF merchant POS terminal. Once the token 100 or card 300 has been turned on, a display 135 or 230 may optionally display an indicia that the card is on and ready for use and/or authentication.

In step 620, the user is optionally authenticated, so that lost or stolen cards may not be used by an unauthorized party. Tokens 100 or cards 300 utilizing this step will not be usable to furnish data or complete financial transactions until the authentication requirement has been satisfied. The requirement can be met a number of ways: (a) the user or cardholder drags a fingertip or stylus across the pad or screen area 405 to reproduce a symbol or glyph substantially similar to a symbol pre-programmed into the processor 105 and memory 110, and once the symbol or glyph is entered by the user on the pad/screen 405, the processor compares its features with a pre-stored representation of a graphical element to determine that the entered symbol's features are within a predetermined range when compared to the pre-stored representation; (b) the user or cardholder enters a pin number or passphrase into the card's user interface 130 such as by depressing a series of keys 310 or touching labeled locations on a touch pad or touch screen 405, and the pin or passphrase matches a respective reference pin or passphrase pre-stored in the memory 110; (c) a biometric aspect of the user or cardholder is scanned and compared to a predetermined biometric value pre-stored in the memory 110; or (d) the card is used in a preauthorized context such as certain trusted merchants, the identity of which is stored in the memory 110. If authorization fails, the user or cardholder is notified by an optional output on a display 135, and authorization may be re-attempted. Optionally, if a predetermined number of unsuccessfully attempts occurs, the token 100 or card 300 is locked out from further transactions until a reset of the token 100 or card 300 occurs by an authorized party. If the optional authorization succeeds, the card is enabled for use.

In optional step 630, the user or cardholder provides input to the token 100 or card 300 to conduct an operation such as selecting an account for which to provide payment for a transaction, performing a calculation, obtaining stored data, storing new data, or modifying user data parameters such as a pin number, passphrase, or authorization glyph or symbol. If no user input is provided, the token 100 or card 300 will be configured to a default state, which may include the previous state or condition of the card when last used. If an account for a transaction or a request for information is selected, the processor 105 obtains the respective data from the memory 110 and renders the to the data encoding area 145 in a form appropriate for the particular mode of output 200. Thus, a token 100 or card 300 may be configured for a particular use, for instance for a user's personal credit account versus that user's business account, or for a particular issuer's account among many that are available to the user. For example, if a cardholder's personal Visa account was selected, the reprogrammable magnetic stripe 330 could be reprogrammed to provide information related to that personal Visa account from the values stored in memory 110.

Once the token 100 or card 300 is ready for use, data is transferred to the intended destination. This may occur by (a) the user or cardholder reading an output from a display 135; (b) a merchant obtaining data through a scan of the magnetic stripe 330; (c) a merchant optically scanning a barcode that is displayed in a data encoding area 145; (d) a merchant reading an electromagnetic signal transmitted from the data encoding area 145; (e) the merchant receiving data through electrical contacts of the merchant's POS terminal that are in physical contact with those provided on the token 100 or card 300; or (f) data is obtained through an electrical connector attached to the token 100 or card 300. Once the data is transferred, for instance, a merchant may complete a financial transaction using the data provided by the token 100 or card 300.

Optionally, after the data is transferred 640, the token 100 or card 300 is secured 650 so that only authorized parties may access the token 100 or card 300 and then turned off 660 so that the processor 105 may assume a standby state to conserve energy on the onboard energy storage device 150. This optional securing step 650 and the poweroff step 660 may be initiated through one or more of the following techniques: (a) allowing a predetermined period of time to pass without inputting any information to the user interface 130; (b) removing the token 100 or card 300 from contact a merchant POS terminal; (c) breaking contact between electrical contacts in the token 100 or card 300 and a merchant POS terminal, charging device, external power source, or conventional electrical connector (e.g.; USB or Firewire™ (IEEE 1394)); (d) removing the token 100 or card 300 from a user device such as a cell phone, PDA, charger, or accessory; (e) depressing an on/off button 305 and/or holding the on/off button down for a predetermined period of time; (f) depressing a predetermined sequence of general purpose buttons 310; (f) touching a predetermined area of touch screen or touch pad 405; or (g) removing the token 100 or card 300 equipped with an antenna/transceiver 220 from the range of an RF merchant POS terminal. Once the appropriate condition has occurred to initiate shutdown, optionally, the token 100 or card 300 erases its reprogrammable magnetic stripe 330, refuses additional inputs except power on and/or authentication inputs, and/or encrypts data stored in the memory 110. Optionally, an indicia may be output to a display 135, indicating that the card is locked and secured.

The steps of a method, process, or algorithm described in connection with the implementations disclosed herein may be embodied directly in hardware, in a software module executed by a processor, or in a combination of the two. The various steps or acts in a method or process may be performed in the order shown in FIG. 6, or may be performed in another order. Additionally, one or more process steps may be omitted or one or more process steps may be added to the processes. An additional step, block, or action may be added in the beginning, end, or intervening existing elements of such processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A financial transaction token for effecting payment for a transaction comprising:
   an assembly having an exposed region for encoding data including an account for effecting the payment for the transaction;
   a capacitor proximal the assembly and coupled to a charging interface and a power circuit the charging interface comprising a piezoelectric crystal and a moveable mass rotatably coupled adjacent the piezoelectric crystal and adapted to rotate toward the piezoelectric crystal which upon impact thereto delivers an electrical current into the charging interface;
   a processor proximal the assembly and coupled to the power circuit;
   a user interface proximal the assembly and coupled to the processor and the power circuit, and
   memory, coupled to the power circuit and the processor, and including code executable to:
      accept, using the user interface, commands for encoding data for the exposed region; and
      perform the commands accepted using the user interface.

2. The financial transaction token as defined in claim 1, wherein the exposed region is selected from the group consisting of:
   a magnetic region for said encoded data;
   an antenna configured to operate with a Point-Of-Service (POS) terminal; and
   a display for a rendering of the encoded data.

3. The financial transaction token as defined in claim 2, wherein the rendered encoded data includes a scannable graphical indicia.

4. The financial transaction token as defined in claim 1, wherein the capacitor is a thin film capacitor.

5. The financial transaction token as defined in claim 1, wherein the capacitor is a multilayer capacitor.

6. The financial transaction token as defined in claim 1, wherein a dielectric disposed between conductive layers of the capacitor is selected from the group consisting of polyester, polypropylene, polycarbonate, polystyrene, polyimide, PTFE, PET, and combinations thereof.

7. The financial transaction token as defined in claim 1, wherein the capacitor is disposed within a recessed cavity defined by the assembly.

8. The financial transaction token as defined in claim 1, wherein the assembly further comprises exposed electrical contacts to the charging interface.

9. The financial transaction token as defined in claim 1, wherein the charging interface further comprises an inductor for receiving electromagnetic signals.

10. The financial transaction token as defined in claim 1, wherein the charging interface further comprises an external electrical connector for receiving a signal.

11. The financial transaction token as defined in claim 1, wherein the executable code in the memory further comprises code for causing the processor to transition into a standby state upon receipt of a predetermined power signal by the charging interface.

12. The financial transaction token as defined in claim 1, wherein the executable code in the memory further comprises code for causing the processor to transition into an active state upon receipt of a predetermined power signal by the charging interface.

13. The financial transaction token as defined in claim 1, wherein the executable code in the memory further comprises code for causing the processor to execute a financial transaction routine corresponding to the account upon receipt of a predetermined signal by the charging interface.

14. The financial transaction token as defined in claim 1, wherein the power circuit is configured to preserve data within the memory.

15. The financial transaction token as defined in claim 1, wherein the user interface further comprises a display coupled to the processor and the power circuit.

16. The financial transaction token as defined in claim 1, wherein the user interface further comprises means for data input.

17. The financial transaction token as defined in claim 1, wherein the charging interface further comprises an inductor.

18. The financial transaction token as defined in claim 1, wherein the exposed region for encoding data further comprises means for shielding the exposed region from physical contact therewith while permitting electromagnetic radiation to pass freely therethrough.

19. The financial transaction token as defined in claim 18, wherein the electromagnetic radiation that passes through the shielding means is selected from the group consisting of RFID signals, IrDA signals, visible light, invisible light, modulated laser, modulated RF communication signals, and combinations thereof.

20. The financial transaction token of claim 1, further comprising a plurality of piezoelectric crystals, and wherein the moveable mass is rotatably coupled to strike at least two of the plurality of piezoelectric crystals as the mass rotates.

21. The financial transaction token of claim 1, wherein the movable mass comprises a pendulum coupled to the substrate about a first end of the pendulum.

22. The financial transaction token of claim 21, wherein the pendulum comprises an elongate member extending between a first and a second crystal of the plurality of crystals, and an impact end member coupled to the second end of the elongate member opposite the first end, the impact end member being substantially perpendicular to the elongate member and configured to strike the first and second crystals as the pendulum swings.

23. A financial transaction token for effecting payment for a transaction and comprising:
    an assembly having an exposed region for encoding data including an account for effecting the payment for the transaction;
    a thin film capacitor proximal the assembly and coupled to a charging interface and a power circuit, the charging interface comprising a piezoelectric crystal and a moveable mass rotatably coupled adjacent the piezoelectric crystal and adapted to rotate toward the piezoelectric crystal which upon impact thereto delivers an electrical current into the charging interface;
    a processor proximal the assembly and coupled to the power circuit;
    a user interface including a means for data entry, whereby said user interface is:
        proximal the assembly;
        coupled to the processor; and
        coupled to the power circuit; and
    memory, coupled to the power circuit and the processor, and including code executable to:
        accept, using the user interface, commands for encoding data for the exposed region; and
        perform the commands accepted using the user interface.

24. The financial transaction token as defined in claim 23, wherein the exposed region is selected from the group consisting of:
    a magnetic region for said encoded data;
    an antenna configured to operate with a POS terminal;
    a display for a rendering of the encoded data; and
    combinations thereof.

25. The token as defined in claim 24, wherein the rendered encoded data includes a scannable graphical indicia.

26. The financial transaction token as defined in claim 23, wherein the assembly further comprises exposed electrical contacts coupled to the charging interface.

27. The financial transaction token as defined in claim 23, wherein the charging interface further comprises an inductor for receiving electromagnetic signals.

28. The financial transaction token as defined in claim 23, wherein the executable code in the memory further comprises code for causing the processor to transition into a standby state upon receipt of a predetermined power signal by the charging interface.

29. The financial transaction token as defined in claim 23, wherein the executable code in the memory further comprises code for causing the processor to transition into an active state upon receipt of a predetermined power signal by the charging interface.

30. The financial transaction token as defined in claim 23, wherein the executable code in the memory further comprises code for causing the processor to execute a financial transaction routine corresponding to the account upon receipt of a predetermined signal by the charging interface.

31. The financial transaction token as defined in claim 23, wherein the power circuit is configured to preserve data within the memory.

32. The financial transaction token as defined in claim 23, wherein the user interface further comprises a display coupled to the processor and the power circuit.

33. The financial transaction token as defined in claim 23, wherein the charging interface further comprises an inductor.

34. The financial transaction token as defined in claim 23, wherein the exposed region for encoding data further comprises means for shielding the exposed region from physical contact therewith while permitting electromagnetic radiation to pass freely therethrough.

35. The financial transaction token as defined in claim 34, wherein the electromagnetic radiation that passes through the shielding means is selected from the group consisting of RFID signals, IrDA signals, visible light, invisible light, modulated laser, modulated RF communication signals, and combinations thereof.

36. A financial transaction card comprising:
    a substantially rigid substrate;
    a reprogrammable magnetic stripe assembly, proximal the substrate, for encoding data including an account for effecting the payment for a transaction;
    a thin film capacitor proximal the substrate and coupled to a charging interface and a power circuit, the charging interface comprising a piezoelectric crystal and a moveable mass rotatably coupled adjacent the piezoelectric crystal and adapted to rotate toward the piezoelectric crystal which upon impact thereto delivers an electrical current into the charging interface;
    a processor located within a cavity defined within the substrate and coupled to the power circuit and to a data interface;
    a user interface proximal the substrate and coupled to the processor and the power circuit wherein the user interface includes:

a display, and
data entry means;
and
memory, coupled to the power circuit and the processor, and including code executable to:
accept, using the user interface, commands for encoding data for the exposed region; and
perform the commands accepted using the user interface.

37. The financial transaction card as defined in claim 36, wherein the executable code in the memory further comprises code for causing the processor to transition into a standby state upon receipt of a predetermined power signal by the charging interface.

38. The financial transaction card as defined in claim 36, wherein the executable code in the memory further comprises code for causing the processor to transition into an active state upon receipt of a predetermined power signal by the charging interface.

39. The financial transaction card as defined in claim 36, wherein the executable code in the memory further comprises code for causing the processor to execute a financial transaction routine corresponding to the account upon receipt of a predetermined signal by the data interface.

40. The financial transaction card as defined in claim 36, wherein the display is configured to render a graphical indicia selected from the group consisting of:
a one-dimensional barcode;
a two-dimensional barcode;
a text string indicating an account;
a text string indicating status information;
a text string indicating an offer; and
combinations thereof.

41. The financial transaction card as defined in claim 36, wherein a biometric indicia is received by the data entry means.

42. The financial transaction card as defined in claim 36, wherein the input means includes a touch pad.

43. The financial transaction card as defined in claim 36, wherein the processor authorizes use of the card upon occurrence of a condition selected from group consisting of:
(a) dragging an object on a surface of an area on the card sensitive to pressure-related inputs to produce a representation of a symbol or glyph, and comparing the entered representation with a second representation pre-stored in the memory to determine that the entered symbol's features are within a predetermined range when compared to the second representation;
(b) entering a passphrase by the input means, and comparing the entered passphrase with a second passphrase pre-stored in the memory to determine that the entered passphrase is within a predetermined range when compared to a the second passphrase;
(c) measuring a biometric aspect of a user or cardholder and comparing the measured biometric aspect with a pre-stored biometric representation to determine that the measured aspect is within a predetermined range when compared to a biometric representation pre-stored in the memory;
(d) the card is used to complete a transaction with a predetermined trusted merchant, the merchant's identifying information having been pre-stored in the memory; and
(e) combinations thereof.

44. The financial transaction card as defined in claim 36, wherein the processor assumes a standby state upon occurrence of a condition selected from group consisting of:
(a) allowing a predetermined period of time to pass without input being received by the input means;
(b) removing the card from contact with a merchant POS terminal;
(c) breaking contact between electrical contacts on the card and a merchant terminal;
(d) breaking contact between electrical contacts on the card and a charging device;
(e) breaking contact between electrical contacts on the card and an external electrical connector;
(f) removing the card from a user device;
(g) depressing an on/off button on the card;
(h) holding an on/off button on the card down for a predetermined period of time;
(i) depressing a predetermined sequence of general purpose buttons affixed to the card;
(j) touching a predetermined area of a touch pad on the card;
(k) removing the card from proximity to a merchant POS terminal; and
(l) combinations thereof.

45. The financial transaction card as defined in claim 36, wherein the processor assumes an active state upon occurrence of a condition selected from group consisting of:
(a) inserting card into a merchant POS terminal, thereby making contact between electrical contacts in the card and the merchant POS terminal;
(b) inserting the card into a user device;
(c) attaching an electrical connector card;
(d) depressing an on/off button on the card;
(e) holding an on/off button on the card down for a predetermined period of time;
(f) touching a touch pad;
(g) bringing the card within broadcast range of an RF merchant POS terminal; and
(h) combinations thereof.

* * * * *